United States Patent [19]

Barker

[11] 4,274,790
[45] Jun. 23, 1981

[54] GRANULAR MATERIAL UNLOADING VEHICLE WITH PRESSURE-RELIEF BOX

[76] Inventor: Walter D. Barker, R.R. 1, St. Paul, Ind. 47272

[21] Appl. No.: 14,699

[22] Filed: Feb. 23, 1979

[51] Int. Cl.³ .............................................. B60P 1/00
[52] U.S. Cl. .................................. 414/502; 414/505; 198/668; 222/227
[58] Field of Search ..................... 414/502, 523, 518; 198/525–538, 661, 669, 861, 670, 367, 636, 637; 222/227

[56] References Cited

U.S. PATENT DOCUMENTS

| | | | |
|---|---|---|---|
| 2,266,650 | 12/1941 | Matheis | 198/668 |
| 2,380,840 | 7/1945 | Hanna | 198/668 |
| 2,481,860 | 9/1949 | Miller | 414/505 |
| 2,758,700 | 8/1956 | Plumb | 198/525 |
| 2,839,208 | 6/1958 | Hansen | 414/505 |
| 3,580,384 | 5/1971 | Pingee | 198/668 |

Primary Examiner—Leslie J. Paperner
Assistant Examiner—L. E. Williams
Attorney, Agent, or Firm—Woodard, Weikart, Emhardt & Naughton

[57] ABSTRACT

An improved granular material unloading vehicle, such as a feed grain cart, comprising a wheeled chassis having a material bin mounted thereto, a substantially horizontal screw conveyor for moving the material from the bin through a discharge opening therein, a substantially vertical screw conveyor in material communication with the horizontal conveyor outside the bin for further moving the material therethrough, a power transmission arrangement for cooperatively driving the horizontal and vertical conveyors and a pressure-relief device for assisting with the start of material conveyance from the bin by relieving pressure in the forward end of the horizontal auger outside the bin and adjacent the junction with the vertical auger during the start of material transfer therebetween. This pressure-relief device includes an elongated inverted box mounted atop the horizontal auger adjacent its forward end and enclosing an internal chamber for expansion of the feed grain during initial or subsequent starts of the unloading operation. The device eliminates the problems of back charging and jamming in the horizontal conveyor and avoids the potential for resulting damage to the farm equipment without slowing down the unloading operation.

8 Claims, 4 Drawing Figures

GRANULAR MATERIAL UNLOADING VEHICLE WITH PRESSURE-RELIEF BOX

BACKGROUND OF THE INVENTION

This invention relates generally to the conveyance of granular material and, in particular, to an improved vehicle for unloading harvested feed grains which includes both a horizontal and a vertical auger to unload grain from the vehicle bin or tank. A pressure-relief box is mounted to the horizontal auger to assist during the start of material unloading by relieving built-up pressure in the auger at a point adjacent its mating with the second vertical auger portion.

Screw conveyers, in general, have been conventionally used for many years to transfer grain or other granular or comminuted materials. In this regard, numerous improvements and variations have been made to these screw conveyors over the years to accomplish special purposes or to eliminate problems experienced with existing conveyor usage.

For example, special concern has been directed to the need for conveying granular material over substantial horizontal distances using a single screw conveyor channel or tube. In Metsa-Ketela, U.S. Pat. No. 4,059,508, this problem was addressed with the solution being to provide a plurality of bypass means 18 to permit continued transport of the granular material passed the several transverse wall means 36 and bearing means 16 needed to support the several conveyors and thereby to convey the material over long distances.

In Rasmussen, U.S. Pat. No. 3,232,419, the problem addressed was the transport of finely divided particles from a region at one pressure to a region at a different pressure without either the loss of pressure from the region of super-atmospheric pressure or the addition of air into the region of sub-atmospheric pressure. The solution disclosed in Rasmussen was to provide a second screw impellor resisting the movement of material through the casing and causing the material to thereby back up and form a pile extending upward into a enlarged chamber disposed above the casing at that point. The material then forms an inclined surface down toward the nearby outlet opening. The material sliding down this surface exits through this outlet while the pile of material forms a seal preventing the exchange of pressure between the beginning and ending regions.

This specialization has also reached the farming industry. For example, self-unloading feed wagons similar to that disclosed in Hall, U.S. Pat. No. 2,439,541, have been around for many years. They generally include a wheel chassis with a hollow body mounted thereon, this body being substantially V-shaped in cross section and forming a container or bin for carrying the harvested grain. A first elongated screw conveyor is positioned near the bottom of this body for moving the grain through a discharge opening in one end thereof. A second screw conveyor is then affixed generally normal to and in registry with this first conveyor outside the body to further move the grain therethrough for discharge into a silo, grain truck or other storage container. A prime mover or other power source is provided to operably drive these interconnecting conveyor portions.

Hansen, U.S. Pat. No. 2,676,721, discloses one modification of this feed wagon designed to eliminate clogging of the grain in the wagon bin. A plurality of feeding and agitating augers are positioned at differing levels in the body with a drag, or belt, conveyor 27 positioned near the bottom to move the grain through the discharge opening. An impellor or blade 48 is rotatably positioned outside this discharge opening to drive the material downwardly into the first of a two-stage auger attachment for transporting the material into a different storage container.

Hansen, U.S. Pat. No. 2,839,208, discloses a further modification in which the impellor unit 42 acts to continuously throw the material from the feeding auger 24 into the vertical discharge auger portion 66.

Another variation of this basic feed wagon design is disclosed in Boone, U.S. Pat. No. 3,721,333, in which a power-operated swingable auger conveyor is disclosed for attachment to any suitable combine harvestor in order both to provide for multi-directional unloading of the grain and to facilitate efficient storage of the equipment.

Still a further problem not satisfactorily addressed by the prior art is the periodic build up of internal pressure in the conveyor sections, and the jamming and overloading it often produces. During the start of material conveyance, the grain is first conveyed horizontally, or at a slight incline, through the discharge opening in the bin and on to the point where transfer is made to the second mating auger portion. As previously stated, this second auger is generally affixed normal, i.e., at about a 90° angle, to the first section and advances the grain in a substantially vertical direction to the final discharge spout or opening. Feed grains often clog and stick at this junction due at least in part to this acute angle between the two mating augers.

This condition is aggravated by the gravitational force that must be overcome in the transfer, and often results in a total binding and clogging of the horizontal conveyor, commonly referred to as "back charging." The condition is further aggravated by the fact that most feed grains must be harvested within a certain range of moisture content. For example, it is recommended that corn be harvested at a 27% to 30% moisture content. This increased moisture promotes sticking between the individual grains which leads to further jamming and clogging at the junction between the auger shafts. The condition is still further aggravated by the distance the horizontal feed auger must convey the grain outside the bin before mating with the vertical pickup auger. As this outside distance increases, so does the likelihood of clutching, wedging or jamming of the grain in the horizontal auger, particularly during the start of transfer therethrough.

The dangers of this jamming are great. For example, the majority of grain cart vehicles presently on the market are driven by power take-off means operably connected to the corresponding power take-off on the farm tractor used to pull the cart. It was early recognized that this increased drag in the screw conveyors could cause substantial wear and stress on the power transmission of the tractor, and could even seize or substantially damage the tractor if a total binding occurred.

For this reason, the majority of available farm equipment driven by power take-off means is equipped with either a shear pin or an adjustable slip clutch so the increased friction in the horizontal screw conveyor will overload this pin or clutch before damaging the tractor transmission. However, these devices merely lessen the damage and do not attempt to remedy the basic problem experienced with these conveyor arrangements.

Accordingly, the back charging of grain in vehicles equipped with these devices often results in shearing off the connecting pins or overloading and wearing the slip clutch, both of which require much downtime to remedy and thereby significantly lessen the efficiency of the harvesting operation.

With most grain unloading vehicles on the market, the problem of back charging is further confronted by mounting a baffle or shield in the grain bin directly above at least a portion of the exposed horizontal auger. This shield aids in controlling the rate of flow of grain into the auger itself and may substantially lessen the back charging problem in vehicles having little or no horizontal grain conveyance by the feed auger after it passes through the discharge opening in the bin. These shields are also often vertically adjustable to further aid in controlling grain flow.

The disadvantages of these shields, however, are several. First, their use restricts the possible designs for grain unloading vehicles as to the distance grain can be conveyed horizontally by the feed conveyor after it leaves the grain bin. In vehicles where this distance is any appreciable amount, such as more than two or three feet, the effectiveness of these shields in lessening the chances of jamming or back charging is substantially decreased, if not eliminated.

Second, the basic objective of these shields is to restrict the access and flow of grain into the auger channel inside the bin. When moisture content is high, or when clogging is noticed, the shields, if adjustable, are tightened down even more over the otherwise exposed screw conveyor to further restrict the access of grain. By so doing, the rate of flow or conveyance of grain through the augers is lowered and the time required to unload the vehicle is correspondingly increased. This condition is highly undesirable for most farmers, having only one or two unloading vehicles to keep up with their harvesting, or combining, operation. Time is of the essence in these circumstances. The loaded vehicle must be moved to the waiting truck or other storage location, unloaded, and then returned to the field for reloading from the combine with a minimum of elapsed time and energy. Otherwise, valuable harvesting time is lost and the efficiency of the farming operation is decreased.

For these reasons, shields and baffles of this type do not provide a total solution for the grain jamming and back charging problems identified above. As already indicated, ineffectiveness is particularly noticed in unloading vehicles or other farming equipment in which grain is conveyed any appreciable horizontal distance after leaving the grain bin and before transferring to the pickup auger.

The need for a total solution to, and not just a mitigation of, this overloading and back charging problem therefore has been and continues to be a major concern to the farming industry.

SUMMARY OF THE INVENTION

One aspect of this invention involves an improved granular material unloading vehicle that includes a means for assisting with material conveyance by relieving pressure in the substantially horizontal conveying means adjacent the point of mating with the second substantially vertical conveying means outside the grain bin during the initial and subsequent starts of material transfer therebetween. This vehicle unloader significantly improves the art by providing a solution to the back charging problem now often experienced during the start of grain transfer from the wheeled cart to a second storage area.

In one mode, this pressure-relief means includes an inverted hollow box mounted atop the horizontal screw conveyor adjacent the transfer area outside the bin and enclosing a chamber wherein the excess grain can expand or go during initial and subsequent starts of the conveying operation. The extra friction and drag in the screw are thereby relieved, and overloading of the slip clutch or shear pin assemblies is prevented. With this overloading eliminated, there is no potential for damage to the power transmission of the tractor or the equipment itself. Feed grains can therefore be transferred to a truck or other storage without concern over damage from this back charging problem and without restricting the flow of grain as with existing grain bin shields or baffles.

Other objects and advantages of the present invention will be apparent from the following description.

DESCRIPTION OF THE PREFERRED EMODIMENT

Figure 1:
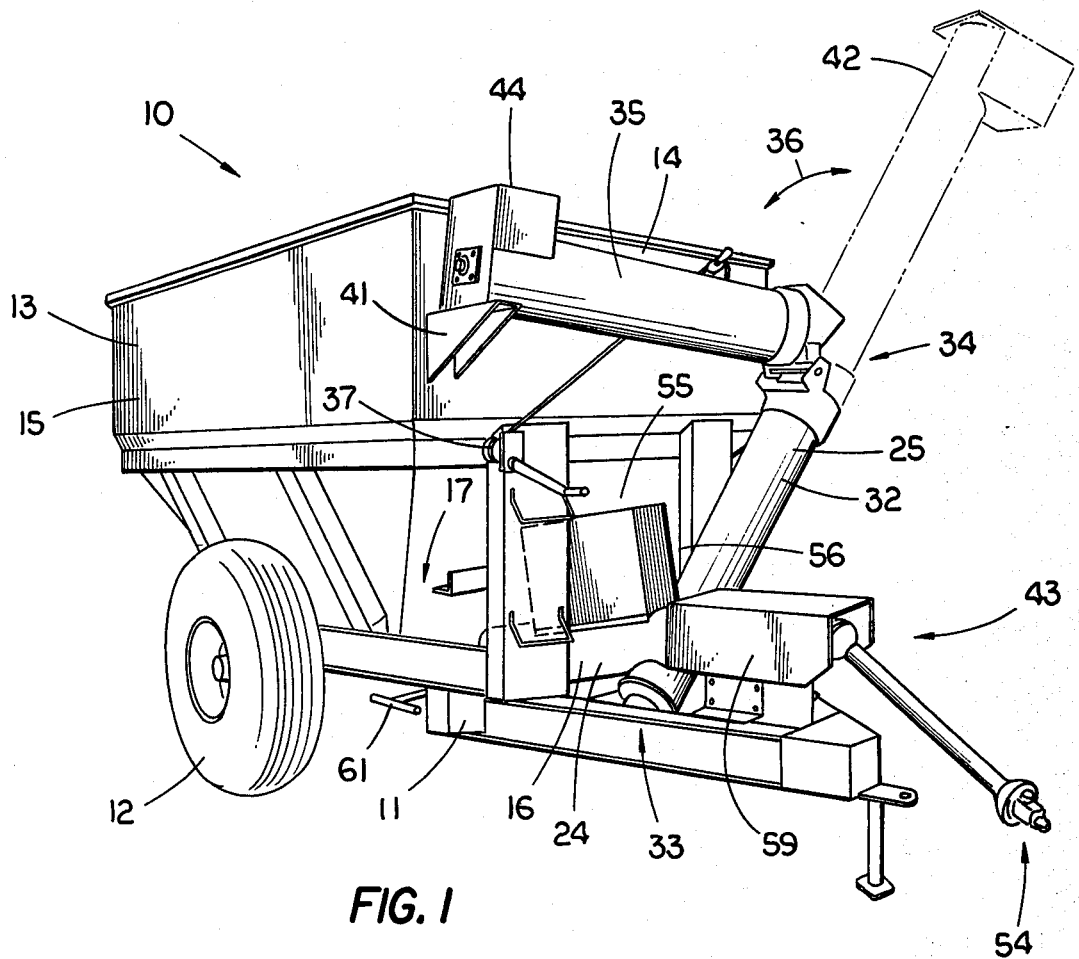
FIG. 1 is a perspective view of the improved grain cart of the preferred embodiment.
Figure 2:
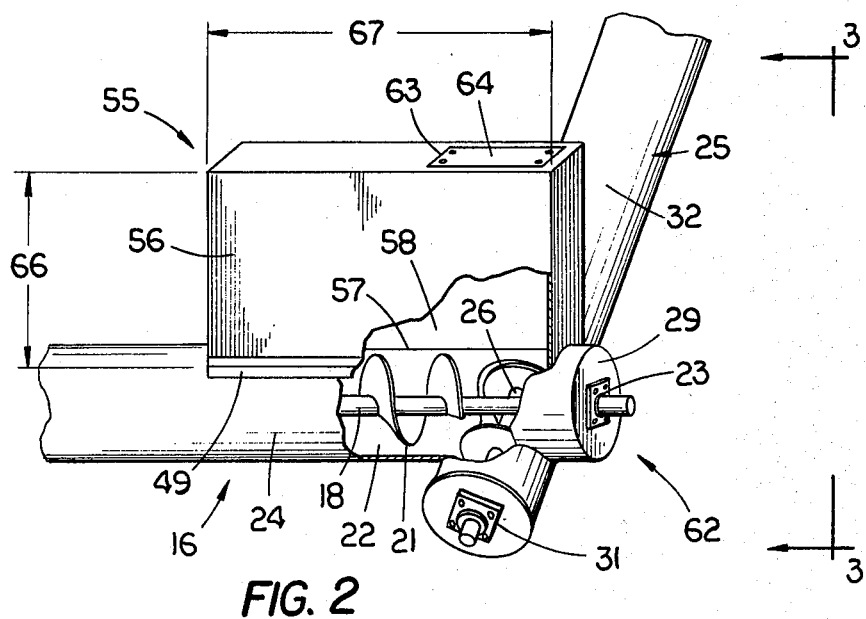
FIG. 2 is a perspective side view of the junction between the horizontal and vertical screw conveyors in FIG. 1 with portions broken away from both the conveyor casings and the pressure-relief box of the preferred embodiment.
Figure 3:
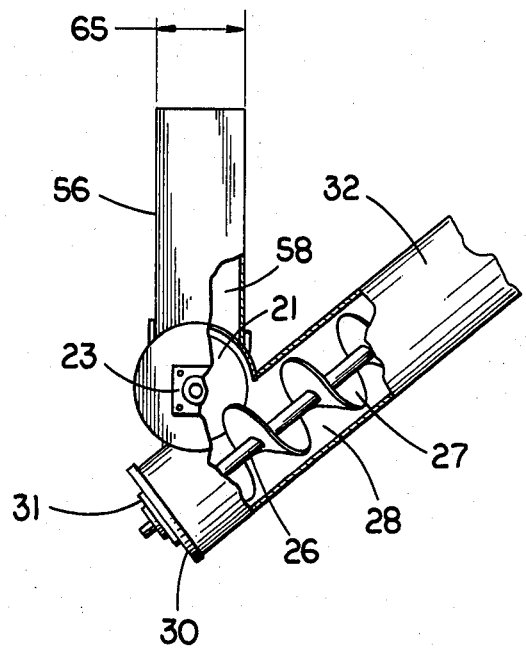
FIG. 3 is a frontal view of the screw conveyors and pressure-relief box of the preferred embodiment taken along line 3—3 in FIG. 2.
Figure 4:
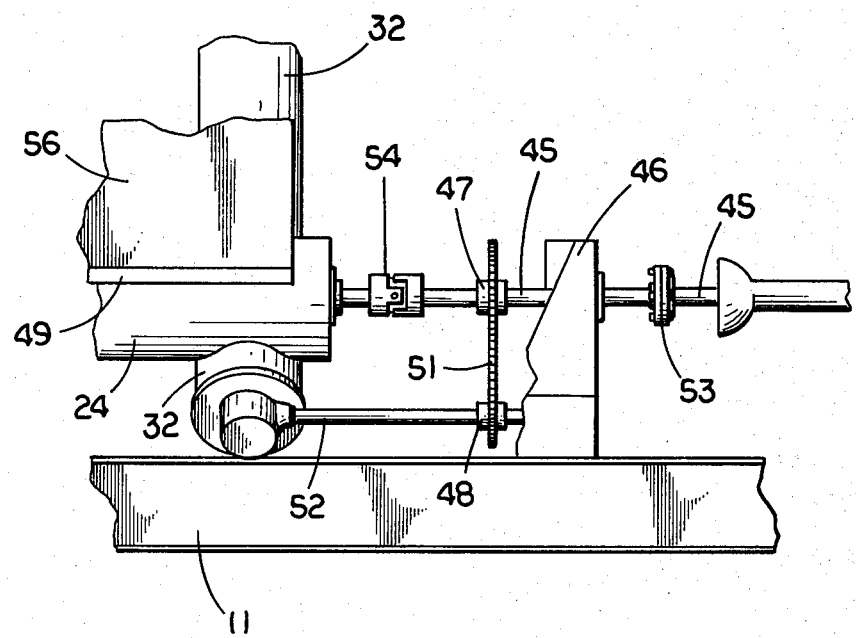
FIG. 4 is an enlarged, fragmented side view of the power transmission and gearing means of the preferred embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As previously suggested, this invention relates generally to granular material conveying arrangements that include at least a first substantially horizontal screw conveying means that is in mating and conveying relation with, i.e., in material communication with, a second substantially vertical screw conveying means. The improvement in this arrangement comprises the introduction of a means for eliminating the potential for back charge jamming in the horizontal conveyor and thereby assisting with the transfer and conveyance of material between the two conveyors. This advantage is achieved by relieving pressure in this horizontal conveyor adjacent the point of attachment with the vertical section, this effect being greatest during the start of material transfer therebetween. In this context, and for the purposes of this application, the terms "significantly horizontal" and "significantly vertical" are meant to include angles of inclination or slope up to about 45° in either direction from the respective horizontal and vertical lines of reference.

A further aspect of this invention comprises the combination of applicant's improvement in a granular material unloading vehicle such as those commonly used in the farming industry. As also previously stated, these vehicles are generally known to include both a wheeled chassis and a hollow body mounted thereto for storage of the feed grain or other material. A horizontal or slightly inclined conveying means is mounted near the bottom of this body for transporting the material through a discharge opening in one end thereof. A second substantially vertical conveying means joins this horizontal conveyor at a point outside the body for further moving the material therethrough and for discharging it through an appropriate spout or other opening. Lastly, some form of power source, prime mover or the like is provided for powering the two conveyors to empty the contents of the storage body.

Referring now to FIG. 1, therein is depicted the granular material unloading vehicle 10 of the preferred embodiment, also commonly referred to as a grain cart. Cart 10 includes a wheeled chassis 11 having two high-flotation tires 12 for ease of mobility in a variety of weather conditions. An upright funnel-type grain body, tank or bin 13 is mounted atop this chassis with end walls and side walls 14 and 15 having their lower portions slanted inwardly toward the center of the chassis and the feed conveying means 16.

Conveying means 16 is substantially horizontal, a portion of which is positioned within the grain bin 13 adjacent the bottom thereof for moving the feed grain from this bin through a discharge opening therein, generally indicated by numeral 17 in FIG. 1. It is an auger-type screw conveyor and includes a rigid shaft 18 having a spiral flighting 21 and being rotatably mounted in an elongated hollow channel 22. A portion of this channel opens to the inside of grain bin 13 while the portion outside the bin is enclosed by a generally tubular casing 24 with the rotary shaft journalled therein by two conventional bearing mounts 23 mounted in circular plates 29 secured to the opposing ends of the casing.

At a point outside the bin, a second substantially vertical screw conveying means 25 is joined in mating and conveying relation with, i.e., registering in material communication with, this first feed conveyor means 16. Means 25 is an auger-type conveyor including a rigid shaft 26 with a spiral flighting 27 thereon and rotatably mounted in an elongated hollow channel 28. Channel 28 is enclosed by a generally tubular casing 32 throughout its length except for the point 33 adjacent its lower end at which channels 22 and 28 mate, or join, to permit transfer of the feed grain therebetween. Rotary shaft 26 is journalled in this casing by means of two conventional bearing mounts 31 mounted in circular plates 30 secured to the opposing ends of the casing.

In preferred grain cart 10, this second vertical conveying means 25 is disjointed at a point 34 along its length. The upper portion 35 is hinged at this point to allow pivoting in directions 36 by means of an appropriate winch 37. In FIG. 1, the upper portion has been lowered into its horizontal position resting against bracket 41. The dotted configuration 42 in FIG. 1 represents the position of conveying means 25 during use.

Grain cart 10 is next equipped with a power transmission means 43 for powering or driving the horizontal and vertical augers in operative association with one another. Numerous examples of these power transmission means are known in the art, and all are suitable for use with applicant's invention so long as they provide a means for cooperatively powering the vertical and horizontal augers to transport grain from the bin for discharge through an appropriate spout or opening 44.

In cart 10 of the preferred embodiment, means 43 includes a main shaft 45 bearingly mounted in a housing 46 and equipped with appropriately sized gears 47 and 48 and a roller chain 51 to cooperatively drive both output countershafts 52 and 53. These countershafts are in turn connected by appropriate means to the horizontal and vertical augers 16 and 25, respectively. An adjustable slip clutch 53 is connected to main shaft 45 opposite this gearing arrangement and is frictionally operated to slip when the drag from the horizontal auger is sufficiently great. The main shaft then connects to a power take-off shaft, commonly called a "PTO" shaft, which is capable of attachment to the corresponding PTO shaft on a tractor (not shown) by an appropriate universal or yoke assembly generally designated by numeral 54 in FIG. 1. A removable cover or shield 59 fits over this geared transmission arrangement to protect it from damage.

Also included in grain cart 10 of the preferred embodiment is applicant's means 55 for assisting with the general conveyance and unloading of grain from bin 13 through the two-part horizontal and vertical auger arrangement. Preferred means 55 accomplishes this goal by relieving pressure in the forward end of horizontal auger 16 adjacent the mating connection with vertical auger 25 during the start of material transfer between the two augers.

In particular, preferred means 55 includes a elongated hollow box 56 inverted above the forward end of the horizontal auger and mounted thereto by welding or other appropriate means. In the preferred embodiment, an L-shaped angle bar 49 is also welded along the long sides of the box to provide greater stability during use. An opening 57 is formed in casing 24 thereby placing channel 22 in material communication with the chamber 58 defined by this inverted box structure.

The operation of preferred pressure-relief means 55 and its significant advantages over the art are described below:

When grain cart 10 is first being used, no grain will be present in channel 22 of the horizontal auger. Likewise, after using the cart for one crop, it is advisable to empty any remaining grain from the bin and horizontal auger before it is used to transport and unload a second crop. This emptying is accomplished through a lower cleanout port (not shown) operated by means of a gravity-door crank 61. Once emptied and cleaned, the cart is then ready for further use. When unloading of the cart is next required, the initial unloading will again be performed without any grain present in channel 22 of the horizontal auger.

As the initial unloading is begun in either situation, grain is pushed through the horizontal auger toward the forward end 62 where it must transfer to the mating vertical auger 25. In the prior art, the grain often jams or clogs when it first reaches this forward end 62 thereby causing a back charging problem. The result of this condition was often the breaking of shear pins, the continuous wearing of the slip clutch and the possible seizing or other damage to the power transmission of the tractor. With means 55 of the preferred embodiment, this buildup of grain during the start of unloading is permitted to expand or overflow into chamber 58 thereby preventing the increased friction and drag that previously resulted in jamming and clogging of the horizontal auger. Once the grain is then transferring properly between the overlapping augers, the level of grain in chamber 58 levels out and remains constant as the rate of discharge of grain from auger 25 equals the movement of grain from bin 13 by auger 16.

A second advantage performed by means 55 relates to restarting the unloading cycle after it is once temporarily halted. At this stage, channels 22 and 28 of the two augers are filled with grain. Chamber 28 is also at least partially filled. However, when unloading is stopped, the level of grain in the chamber drops a measurable amount as the grain settles down into the auger channel. The exact amount of this settling depends, of course, both upon the dimensions of the box and auger and upon many other factors. In experimenting with cart 10 of the preferred embodiment, a grain level drop of about two (2) inches was encountered when the unloading operation was periodically stopped.

When unloading is restarted, the problem is once again to establish the proper rate of discharge of grain from spout 44 without overloading the horizontal auger during the initial stages of unloading. As before, this is accomplished by the excess buildup of grain in the forward end 62 of the horizontal auger expanding, or rising, into chamber 58 when the power transmission means is started. Even if chamber 58 had previously been substantially full, the intermediate settling of the grain provides room for the grain to now expand thereby relieving the pressure until full-scale grain transfer between the augers is underway.

Means 55 and grain cart 10 of the preferred embodiment are therefore substantial improvements over the present state of the art in this area. Back charging is effectively handled, as is the resulting potential for damage to shear pins or a slip clutch or to the tractor transmission itself. An efficient unloading operation is thus maintained without requiring any restriction of the flow or access of grain into the horizontal auger as with a grain bin shield, although such a shield can in fact be used in combination with applicant's invention, if desired.

An additional feature of pressure-relief box 56 of the preferred embodiment is the inclusion of an inspection port 63 covered by a removable plate 64 to permit easy inspection and cleaning of the box and the auger junction. In the event of a substantial jamming for any reason of the vertical auger, this port and cover also function as a secondary safeguard device to the shear pins or slip clutch. In such a circumstance, the cover will be forced off by the accumulating grain before the internal pressure is sufficiently great to seize the PTO shaft or to damage the welds on the pressure-relief box itself.

The dimensions of pressure-relief box 56 can vary greatly with specific applications and depending upon a great number of independent factors. It is easily recognized, however, that the degree or amount of relief from the pressure built up in the horizontal auger is at least directly related to the size of chamber 58 and the amount of grain that can expand into the chamber during the start of the unloading operation. For this reason, it is generally seen advisable to construct box 56 as large as possible in view of the area restrictions imposed by the particular grain unloading vehicle being used.

For example, in preferred cart 10 horizontal auger 16 has a casing 24 that is 9 inches in outside diameter. The length of casing available for inclusion of the box 56 is not much in excess of 3½ feet. For these reasons, box 56 of the preferred embodiment is 7 inches in width, 16 inches in height and 36 inches in length as depicted by numerals 65, 66 and 67, respectively. In this regard, testing to date has indicated it is desirable that the box length is about at least two feet and the box height is about twice the diameter of the horizontal auger to ensure a suitable chamber for most circumstances commonly encountered.

As is evident from the above description, applicant's preferred pressure-relief means 55 is adaptable for use in combination with most, if not all, grain unloading vehicles now on the market which require at least some horizontal conveyance of grain by the feed auger outside the grain bin and before transfer to the vertical pickup auger. In the preferred embodiment, grain cart 10 was a John Deere Model No. 1210 Grain Cart marketed by the John Deere Co. of Moline, Ill. Accompanying this application is a copy of the operator's manual for this Model No. 1210 cart, and the same is hereby expressly incorporated herein by reference as to all relevant and material disclosure contained therein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A granular material unloading vehicle, comprising:
   (a) a wheeled chassis;
   (b) a material bin mounted thereto;
   (c) a first substantially horizontal screw conveying means for moving the material from said bin through a discharge opening therein;
   (d) a second substantially vertical screw conveying means in mating relation with said first means outside said bin for further moving the material therethrough;
   (e) a power transmission means for driving said first means in operative association with said second means; and
   (f) a means for assisting with material conveyance from said bin by relieving pressure in the mating end of said first means during the start of material transfer therethrough, said pressure-relief means includes an elongated inverted box mounted atop said first means outside said bin and adjacent the mating junction with said second means, said box enclosing an expansion chamber therein in material communication with said first means.

2. The vehicle of claim 1 in which said box is about at least two feet in length and has a height equal to about two times the diameter of said first means.

3. The vehicle of claim 2 in which said first means and said second means are both auger conveyors, including:
   (a) a rigid shaft with spiral flighting thereon;
   (b) an elongated hollow channel, said shaft being bearingly mounted and rotatable within said channel; and
   (c) a generally tubular casing enclosing a portion of said channel.

4. The vehicle of claim 2 or 3 in which said box includes an inspection and safety port, and a cover plate removably mounted thereon.

5. The vehicle of claim 4 in which said power transmission means includes a power take-off shaft operably connected to drive said first means and said second means and further including means for attachment to the power take-off shaft of a tractor.

6. The vehicle of claim 4 in which a portion of the auger conveyor of said first means is positioned adjacent the bottom of said bin and in material communication therewith.

7. The vehicle of claim 6 in which the auger conveyor of said first means at the forward end thereof is in overlapping and mating relation with the lower end of the auger conveyor of said second means.

8. The vehicle of claim 7 in which said power transmission means further includes an adjustable slip clutch.

* * * * *